Figure 3:
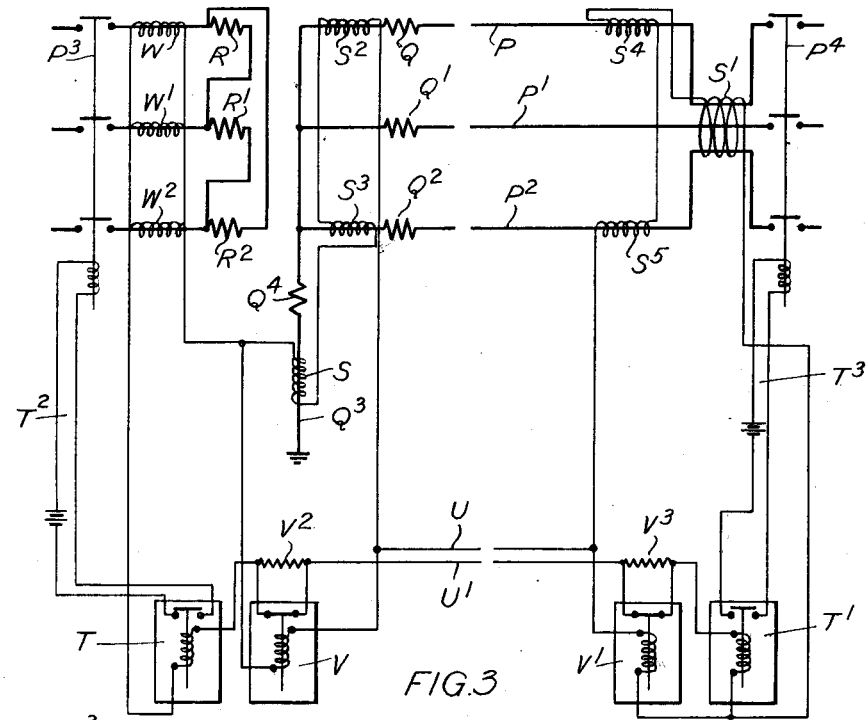

Sept. 10, 1929.    H. W. CLOTHIER ET AL    1,728,105
ELECTRIC PROTECTIVE SYSTEM
Filed July 13, 1925    3 Sheets-Sheet 1
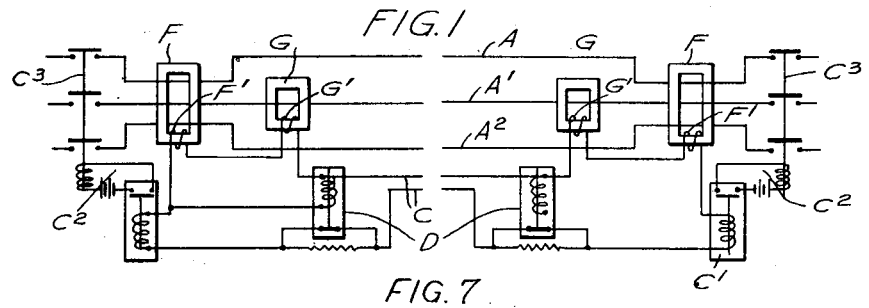
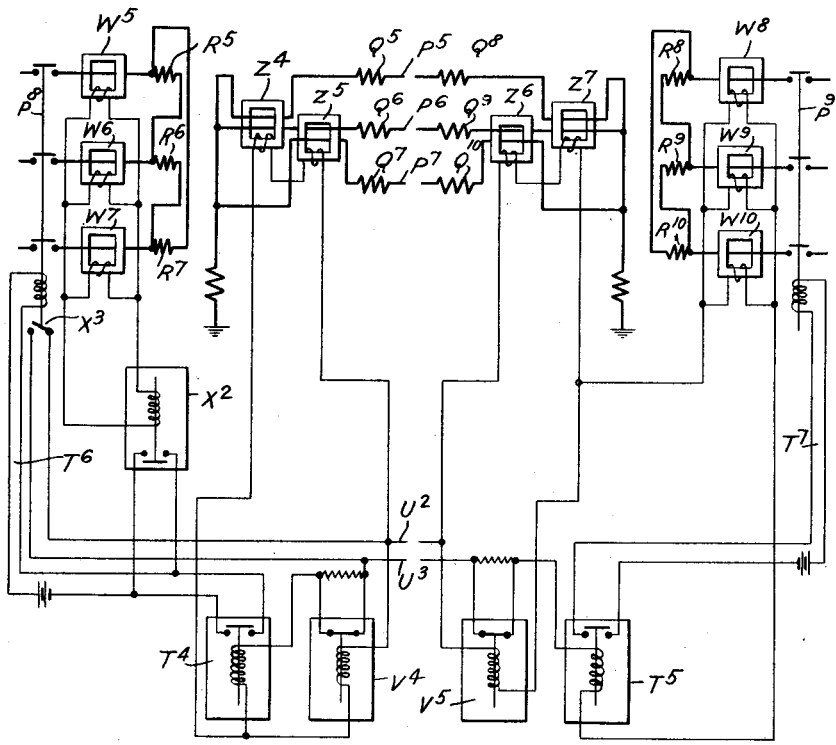
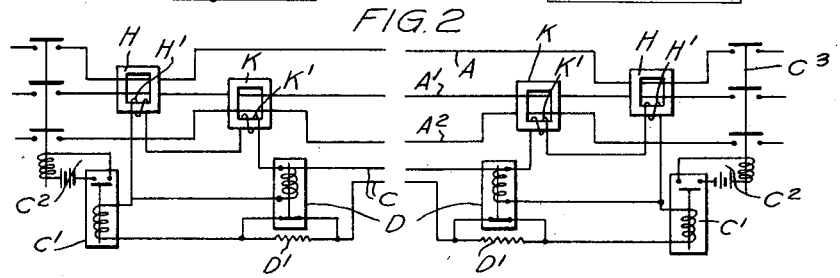

Sept. 10, 1929. H. W. CLOTHIER ET AL 1,728,105
ELECTRIC PROTECTIVE SYSTEM
Filed July 13, 1925  3 Sheets-Sheet 2

Patented Sept. 10, 1929.

1,728,105

UNITED STATES PATENT OFFICE.

HENRY WILLIAM CLOTHIER, OF WALLSEND-ON-TYNE, AND REGINALD WILLIAM BILES, OF BALCOMBE, ENGLAND, ASSIGNORS TO A. REYROLLE & COMPANY LIMITED, OF HEBBURN-ON-TYNE, ENGLAND, A REGISTERED COMPANY OF GREAT BRITAIN.

ELECTRIC PROTECTIVE SYSTEM.

Application filed July 13, 1925, Serial No. 43,361, and in Great Britain August 7, 1924.

This invention relates to electric protective systems and has for its primary object to provide a simple system for the complete protection of a three-phase feeder or other three-phase set of conductors against earth faults or faults between phases.

A further object of the invention relates to the protection of a feeder or other conductor or set of conductors having a power transformer connected to one end or to each end thereof. In this case provision is made for the complete protection against earth faults and faults between phases on the feeder and against earth faults on the power transformer or transformers. The system may also be arranged to give protection against faults between phases on the transformer, but this is usually unnecessary owing to the fact that such faults cannot occur with the mechanical construction commonly employed for such power transformers.

Whether for the protection of a feeder alone or of a feeder connected to a power transformer, an important object of the invention is to provide a system having a minimum number of protective relays and pilot wires to give the protection desired.

In view of the fact that some of the alternative arrangements by which the invention may be carried into practice are such as to cause increased difficulty in balancing in the secondary circuit and therefore to require comparatively high fault settings on the tripping relays, a further object of the invention is to provide an extra stabilizing device to enable such fault settings to be reduced.

Still further objects will be apparent from the following description of the accompanying drawings, in which Figures 1-2 show diagrammatically two alternative arrangements for the protection of a three-phase feeder, Figures 3-6 show four alternative arrangements for the protection of a feeder having a power transformer at one end, and, Figure 7 shows an arrangement for the protection of a feeder having a power transformer at each end.

In the arrangement shown in Figure 1 the three-phase feeder A, A', A², is provided at each end with protective transforming apparatus consisting of two iron core ring type current transformers F and G having secondary windings F', G', connected in series with one another and with a two-core pilot circuit C in such a manner that there is normally a balance of E. M. F.'s in the pilot circuit. The pilot circuit contains at each end the operating coil of a relay C¹ which controls a tripping circuit C² for a circuit breaker C³ in the feeder.

All three phases A, A', A², of the feeder are passed through the transformer F, the phases A, A' in one direction and the phase A² in the reverse direction. The phase A' is also passed through the second transformer G. The secondary windings F', G', are connected together in such a manner that the inductive effects of the phase A' on them are additive.

The sensitiveness of each of the tripping relays C¹ is controlled by means of a relatively insensitive diverter relay D, whose operating coil is connected across the pilot circuit C between the tripping relay C¹ and the transformer secondary B¹. This diverter relay D acts on the passage of heavy straight-through currents to open or close a circuit and thereby to decrease the sensitiveness of the tripping relay, but at other times leaving such sensitiveness unimpaired. In the example shown the diverter relay decreases the sensitiveness of the tripping relay by introducing a resistance D¹ in series with it but it may do so in other ways, as for example by shunting it or by cutting out one operating coil of the relay and switching in another. This arrangement allows the tripping relay to have a low fault setting without risk of undesired operation as a result of heavy straight-through currents.

In operation a fault to earth on either of the phases A and A² will affect the transformer F at each end and will disturb the balance in the pilot circuit C, whilst a fault to earth on the phase A' will affect both transformers F and G at each end and will disturb the balance owing to the fact that the inductive effects on the secondary windings F′, G′ are additive. For a fault between the phases A and A², the balance will be disturbed owing to the fact that these two phases pass through the transformer F in opposite directions. In the case of a fault between the phase A′ and one or other of the phases A or A², both transformers will be affected at each end. Since the phase A′ affects both secondary windings F′ and G′, it will have a greater inductive effect on the secondary circuit than the phase A (or A²) which only affects the secondary winding F′, and consequently the balance in the pilot circuit will be disturbed in this case also.

Figure 2 shows another arrangement in which two transformers H K are employed for each transforming device. In this case each transformer embraces two of the phases of the feeder, the phase A¹ thus passing through both transformers. The secondary windings H¹ K¹ of these transformers are connected in series in the pilot circuit which is arranged in a manner exactly similar to that shown in Figure 1 or in Figure 3. The directions in which the phases A A¹ A² are passed through the transformers and the directions of winding of the secondaries H¹ K¹ are such that the inductive effects of the phases A and A² on the secondary circuit are opposite to one another, whilst the inductive effects of the phase A¹ on the two secondary windings H¹ K¹ are additive.

In this case a fault from the phase A to earth or to the phase A¹ will affect the transformer H and a corresponding fault from the phase A² will affect the transformer K, whilst a fault to earth from the phase A¹ or a fault between the phases A A² will affect both transformers, so that the balance in the pilot circuit is disturbed.

It may be mentioned that the desired results may be obtained with two transformers arranged in other ways. Thus either of the transformers H K could embrace all three phases instead of two, provided that the arrangement is such as to give opposite inductive effects for the phases A and A² and an increased or decreased inductive effect for the phase A¹.

It will be noticed that in the foregoing arrangements protective transforming apparatus is disposed at each end of the feeder to be protected, and the secondary windings of the transforming apparatus are so connected into a two-core pilot circuit that there is normally a balance of E. M. F.'s in that circuit. The transforming apparatus at each end is in each case equivalent to an iron core ring type transformer, through which the three phases of the feeder are passed two in one direction and the third in the reverse direction, and in which one phase is arranged to have a greater or less inductive effect on the secondary winding than either of the other two phases. Thus in each arrangement under normal conditions two of the phases have equal and opposite inductive effects on the secondary circuit whilst the third phase has a greater or less effect than either of the first two. In this connection it must be remembered that normally the currents carried by the three phases are out of phase with one another, and the phrase "equal and opposite effects" must not therefore be taken to mean that the inductive effects of the first two phases balance one another at every instant, but that the transformers are so arranged that these effects would balance if the currents were in phase with one another. Under normal conditions, however, there is a balance in the pilot circuit owing to the fact that the transforming devices at the two ends of the feeder are balanced against one another.

Figures 3—6 show alternative arrangements for the protection of a feeder and of a power transformer connected to it at one end. In each case protective current transforming apparatus is disposed at each end of the feeder, and the secondary windings are so connected in series with one another in a two-core pilot circuit that there is normally a balance of E. M. F.'s in that circuit. Further protective current transforming apparatus is disposed on the side of the power transformer remote from the feeder, and its secondary circuit cooperates with the two-core pilot circuit in such a maner that when operated in consequence of a fault it will disturb the normal balance in the pilot circuit.

In all four arrangements the three phases P P¹ P² of the feeder are connected to the three coils Q Q¹ Q² of one winding of the power transformer, these coils being connected together in star and the neutral point being earthed at Q³ through an earthing resistance Q⁴. The three coils R R¹ R² of the other winding of the power transformer are connected in delta. Oil circuit breakers P³ and P⁴ are provided respectively on the delta side of the power transformer and at the far end of the feeder.

Figure 4:
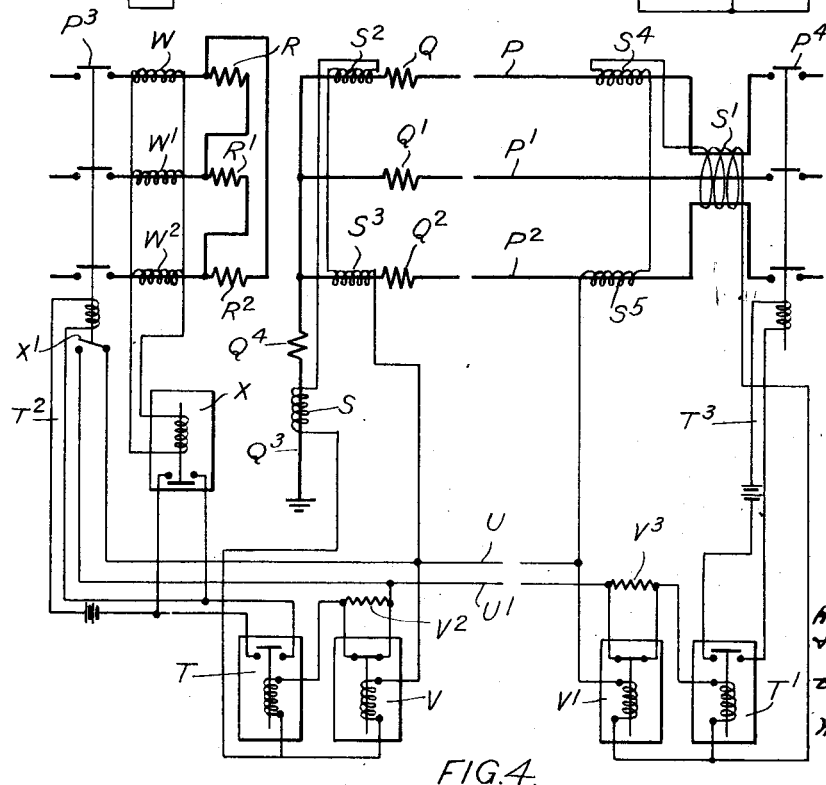
Figure 5:
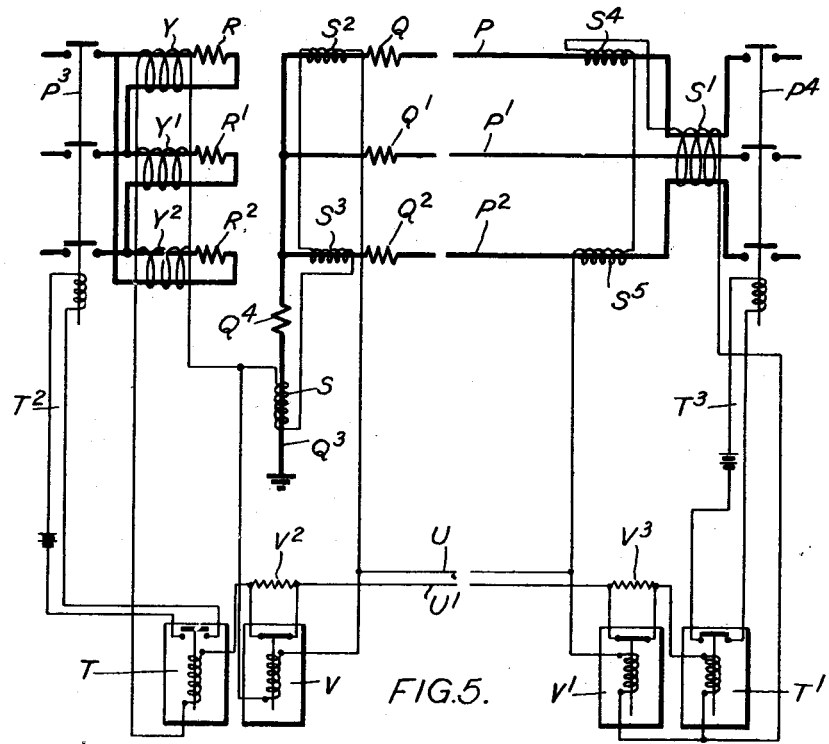

In the arrangements of Figures 3 to 5 an earth leakage current transformer S is provided on the earthing connection Q³ between the earthing resistance Q⁴ and the earth point, and this transformer S is associated with an earth leakage current transformer S¹ embracing the three phases P P¹ P² of the feeder at the far end. These two current transformers S S¹ serve to provide protection against earth faults on the feeder and on the winding Q Q¹ Q² of the power transformer. Protection against interphase faults is obtained by means of four further current transformers $S^2$ $S^3$ $S^4$ $S^5$. Of these four transformers, two $S^4$ and $S^5$ are disposed at the far end of the feeder respectively on the phases P and $P^2$, the secondary windings of these two transformers $S^4$ $S^5$ being connected in series with one another (but in opposite senses) and also in series with the secondary winding of the adjacent earth leakage transformer $S^1$. The other two transformers $S^2$ and $S^3$ are disposed respectively on the same two phases P and $P^2$ but at the end adjacent to the power transformer and preferably between the coils Q $Q^2$ of the power transformer winding and the star point. The secondary windings of these two transformers $S^2$ $S^3$ are connected in series with one another (but in opposite senses) and also in series with the secondary winding of the adjacent earth leakage transformer S.

The secondary windings of all these current transformers S $S^1$ $S^2$ $S^3$ $S^4$ $S^5$ are connected in series with the operating coil of a sensitive tripping relay T or $T^1$ at each end and with the two cores U $U^1$ of a two-core pilot cable which runs along the whole length of the feeder P $P^1$ $P^2$. These sensitive relays T $T^1$ respectively control tripping circuits $T^2$ $T^3$ for operating the circuit breakers $P^3$ $P^4$.

Connected across the pilot circuit U $U^1$ at each end between the sensitive relay T (or $T^1$) and the current transformer secondary windings is the operating coil of a relatively insensitive diverter relay V (or $V^1$). This diverter relay acts on the passage of heavy straight-through currents in the feeder to close or open a circuit and thereby to decrease the sensitiveness of the tripping relay T (or $T^1$), but at other times leaving such sensitiveness unimpaired. In the example illustrated the diverter relay V (or $V^1$) decreases the sensitiveness of the tripping relay T (or $T^1$) by introducing a resistance $V^2$ (or $V^3$) in series with it, but it may do so in other ways as for example by shunting it or by cutting out one operating coil in the relay and switching in another. This arrangement allows the sensitive tripping relay to be given a low fault setting without risk of undesired operation during the passage of heavy straight-through currents in the feeder.

The circuits so far described serve to give complete protection against earth faults and interphase faults on the feeder P $P^1$ $P^2$ and on the power transformer winding Q $Q^1$ $Q^2$. Various arrangements may be employed for protecting the other winding R $R^1$ $R^2$ of the power transformer and three alternative arrangements are shown in Figure 3–5 of the drawings.

In Figure 3 three earth leakage current transformers W $W^1$ $W^2$, one on each phase, are provided respectively between the coils R $R^1$ $R^2$ and the circuit breaker $P^3$, and the secondary windings of these current transformers are connected in parallel with one another. These parallel secondary windings are connected into the pilot circuit in series with the secondary windings of the transformers S $S^2$ $S^3$, and with this arrangement an earth fault on the power transformer will disturb the normal balance in the pilot circuit and will cause the tripping relays T $T^1$ to operate the circuit breakers $P^3$ $P^4$ to cut out the feeder and the power transformer at both ends.

In the arrangement shown in Figure 4 similar earth leakage current transformers W $W^1$ $W^2$ are provided with their secondary windings connected in parallel, but in this case these secondary windings are connected in series with the operating coil of a separate tripping relay X instead of with the other secondary windings. This relay X also controls the tripping circuit $T^2$ for the adjacent circuit breaker $P^3$, and in order to ensure that the circuit breaker $P^4$ at the far end of the feeder will be simultaneously tripped, an auxiliary switch $X^1$ is provided which is mechanically connected to the circuit breaker $P^3$. This switch $X^1$ is connected across the two cores U $U^1$ of the pilot cable and acts when closed to short circuit these cores and thus to disturb the normal balance in the pilot circuit.

The arrangements shown in Figures 3 and 4 serve to provide protection against earth faults in the power transformer winding R $R^1$ $R^2$ but will remain inoperative in the case of interphase faults. Protection against interphase faults is unnecessary in many cases when the mechanical construction of the power transformer is such that each pair of phase coils of the windings is built as a unit entirely separate from the other phase coils. When, however, such protection is required it may be obtained in the manner shown in Figure 5. In this case three earth leakage current transformers Y $Y^1$ $Y^2$ are provided which embrace not only the outgoing leads from the delta coils R $R^1$ $R^2$ of the winding but also the leads connecting consecutive coils with one another, each transformer thus embracing two leads which pass respectively from the two ends of a phase coil. In the arrangement illustrated in Figure 5 the three secondary windings of the transformers Y $Y^1$ $Y^2$ are connected in parallel with one another and in series with the secondary windings of the transformers S $S^2$ $S^3$, the arrangement being similar to that shown in Figure 3. It will be understood however that these secondary windings may operate a separate tripping relay after the manner of Figure 4, if desired.

These arrangements provide instantaneous operation for faults on the power transformer and also avoid the out-of-balance effects due to magnetizing "kicks" when switching in.

It will be understood that the particular arrangements described have been given by way of example only and that other arrangements of the protective current transformers in relation to the feeder and the power transformer may be employed within the scope of the invention. Thus an arrangement of current transformers equivalent to an iron core ring type transformer, through which the three phases of the feeder are passed, two in one direction and the third in the reverse direction, and in which one phase is arranged to have a greater or less inductive effect on the secondary winding than either of the other two phases, may be employed for the protection of the feeder and the high tension winding of the power transformer. One such arrangement (namely that corresponding to Figure 1) is shown by way of example in Figure 6.

Figure 6:
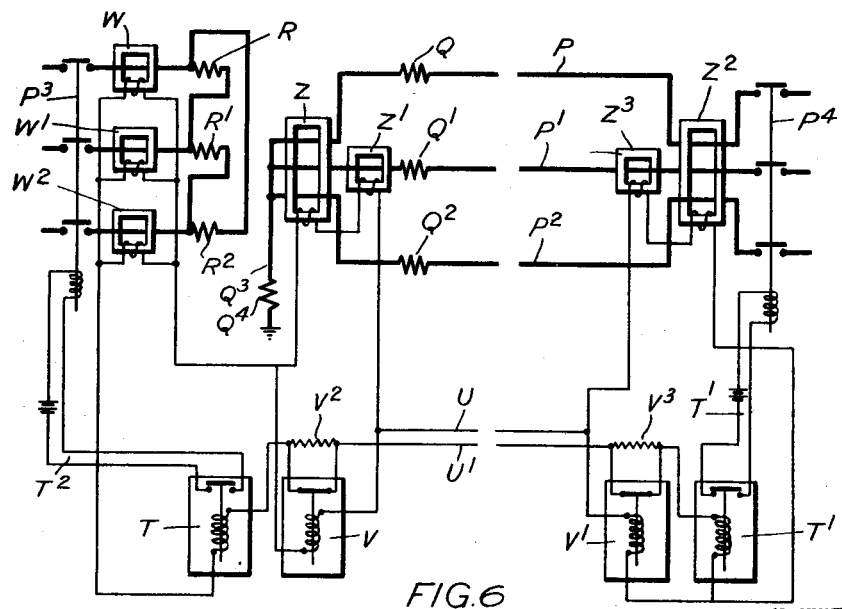

The arrangement shown in Figure 6 is identical with that shown in Figure 3 with the exception that the current transformers $S\ S^1\ S^2\ S^3\ S^4\ S^5$ are replaced by four differently arranged current transformers $Z\ Z^1\ Z^2\ Z^3$, and the same reference letters are employed as in Figure 3. Of these transformers two $Z\ Z^1$ are disposed between the coils $Q\ Q^1\ Q^2$ of the power transformer winding and the earthing resistance $Q^4$, whilst the other two $Z^2\ Z^3$ are disposed at the far end of the feeder. The transformers $Z\ Z^2$ embrace all three phases $P\ P^1\ P^2$ of the feeder, the phases P and $P^2$ being passed through the cores in opposite directions. The transformers $Z^1\ Z^3$ embrace only the phase $P^1$, and the secondary windings of each pair of transformers $Z\ Z^1$ or $Z^2\ Z^3$ are connected into the pilot circuit in series with one another so that the inductive effects of the phase $P^1$ on the two secondary windings are additive. Owing to the facts that the phases P and $P^2$ are passed through the transformer Z in opposite directions and that the inductive effect of the phase $P^1$ on the secondary circuit is greater than that of either of the phases P or $P^2$, this arrangement will give complete protection against earth faults and interphase faults in the feeder $P\ P^1\ P^2$ or in the power transformer winding $Q\ Q^1\ Q^2$.

As has already been mentioned the arrangements according to the invention can readily be adapted to the case when a power transformer is provided at each end of the feeder, and one such arrangement is illustrated by way of example in Figure 7. In this arrangement the feeder and the adjacent power transformer windings are protected by means of current transformers arranged in the manner shown in Figure 2, whilst the other windings of the two power transformers are protected by means of earth leakage transformers operating in the one case in the manner described with reference to Figure 3 and in the other case as described for Figure 4.

In the arrangement of Figure 7 the three phases $P^5\ P^6\ P^7$ of the feeder are connected at one end to the three coils $Q^5\ Q^6\ Q^7$ of one winding of one of the power transformers and at the other end to the three coils $Q^8\ Q^9\ Q^{10}$ of one winding of the other power transformer. The feeder and the power transformer windings to which it is connected are protected by means of four current transformers $Z^4\ Z^5\ Z^6\ Z^7$ arranged in exactly the same manner as the transformers H H K K in Figure 2. The coils $R^5\ R^6\ R^7$ of the other winding of the first power transformer are protected by means of earth leakage transformers $W^5\ W^6\ W^7$ the arrangement being similar to that of Figure 4, whilst the coils $R^8\ R^9\ R^{10}$ of the other winding of the second power transformer are protected by means of earth leakage transformers $W^8\ W^9\ W^{10}$ the arrangement being similar to that of Figure 3.

Thus the secondary windings of the transformers $W^8\ W^9\ W^{10}$ are connected in parallel with one another and in series with the secondary windings of the transformers $Z^4\ Z^5\ Z^6\ Z^7$, the two cores $U^2\ U^3$ of the pilot circuit and the operating coils of the tripping relays $T^4\ T^5$. These relays $T^4\ T^5$ respectively control the tripping circuits $T^6\ T^7$ of circuit breakers $P^8\ P^9$ which are disposed on the sides of the power transformers remote from the feeder. The secondary windings of the transformers $W^5\ W^6\ W^7$ are connected in parallel and control an additional tripping relay $X^2$, which also operates the tripping circuit $T^6$, an auxiliary switch $X^3$ being provided on the circuit breaker $P^8$ to short circuit the two cores $U^2\ U^3$ of the pilot circuit. The sensitiveness of the two tripping relays $T^4\ T^5$ is varied in accordance with the conditions in the feeder by means of diverter relays $V^4\ V^5$ in the manner previously described. The operation of this arrangement will be readily understood from the description already given with reference to Figures 2, 3 and 4. It will also be understood that the arrangements described with reference to figures other than Figures 2, 3 and 4 are equally applicable to the case when a power transformer is provided at each end of the feeder.

The arrangements described and illustrated may also be modified in other ways without departing from the scope of the invention.

What we claim as our invention and desire to secure by Letters Patent is:—

1. In an electric protective system for a three-phase feeder or other three-phase set of conductors, the combination of two protective current transformers of the iron core ring type having their secondaries connected in series with one another disposed at each end of the feeder, a two-core pilot circuit into which the secondary windings of the transformers are so connected that there is normally a balance of E. M. F.'s in the pilot circuit, and means whereby the out-of-balance effect in the pilot circuit resulting from a fault in the feeder is caused to cut out the feeder, one phase of the protected feeder being passed through both transformer cores in such a direction that its inductive effects on the secondary windings are additive whilst the other two phases are each passed through one transformer core so that their inductive effects on the secondary circuit are opposed.

2. In an electric protective system for a three-phase feeder or other three-phase set of conductors, the combination of two protective current transformers of the iron core ring type having their secondaries connected in series with one another disposed at each end of the feeder, a two-core pilot circuit into which the secondary windings of the transformers are so connected that there is normally a balance of E. M. F.'s in the pilot circuit, a circuit breaker at each end of the feeder, tripping relays controlling the circuit breakers and responsive to out-of-balance currents in the pilot circuit, and means for varying the sensitiveness of each tripping relay in accordance with the conditions in the main protected feeder, one phase of the protected feeder being passed through both transformer cores in such a direction that its inductive effects on the secondary windings are additive whilst the other two phases are each passed through one transformer core so that their inductive effects on the secondary circuit are opposed.

3. In an electric protective system for a feeder or other conductor or set of conductors having a power transformer connected to one end thereof, the combination of protective current transforming apparatus disposed at the ends of the feeder, a two-core pilot circuit into which the secondary windings of the said current transforming apparatus are so connected that there is normally a balance of E. M. F.'s in the pilot circuit, protective current transforming apparatus disposed on the side of the power transformer remote from the feeder and having a secondary circuit which cooperates with the pilot circuit in such a manner that when operated in consequence of a fault it will disturb the normal balance in the pilot circuit, and means whereby the out-of-balance effect in the pilot circuit resulting from a fault in the feeder or the power transformer is caused to cut out the feeder and the transformer.

4. In an electric protective system for a feeder or other conductor or set of conductors having a power transformer connected to each end thereof, the combination of protective current transforming apparatus disposed at the ends of the feeder, a two-core pilot circuit into which the secondary windings of the said current transforming apparatus are so connected that there is normally a balance of E. M. F.'s in the pilot circuit, protective current transforming apparatus disposed on the side of each power transformer remote from the feeder and having a secondary circuit which cooperates with the pilot circuit in such a manner that when operated in consequence of a fault it will disturb the normal balance in the pilot circuit, and means whereby the out-of-balance effect in the pilot circuit resulting from a fault in the feeder or either power transformer is caused to cut out the feeder and the transformers.

5. In an electric protective system for a feeder or other conductor or set of conductors having a power transformer connected to one end thereof, the combination of protective current transforming apparatus disposed at the ends of the feeder, a two-core pilot circuit into which the secondary windings of the said current transforming apparatus are so connected that there is normally a balance of E. M. F.'s in the pilot circuit, a circuit breaker on the side of the power transformer remote from the feeder, a circuit breaker at the end of the feeder remote from the power transformer, tripping relays controlling the circuit breakers and responsive to out-of-balance currents in the pilot circuit, a separate earth leakage protective device on the side of the power transformer remote from the feeder, tripping means whereby this earth leakage protective device is caused to operate the adjacent circuit breaker when a fault occurs on the power transformer winding and an auxiliary switch which is associated with such tripping means and acts to short-circuit the two cores of the pilot circuit when such tripping means operates and thereby to operate the tripping relays.

6. In an electric protective system for a three-phase feeder or other three-phase set of conductors having a power transformer connected to one end thereof, the combination of protective current transforming apparatus disposed at the ends of the feeder, a two-core pilot circuit into which the secondary windings of the said current transforming apparatus are so connected that there is normally a balance of E. M. F.'s in the pilot circuit, protective current transforming apparatus disposed on the side of the power transformer remote from the feeder and having a secondary circuit which cooperates with the pilot circuit in such a manner that when operated in consequence of a fault it will disturb the normal balance in the pilot circuit, and means whereby the out-of-balance effect in the pilot circuit resulting from a fault in the feeder or the power transformer is caused to cut out the feeder and the transformer, the transforming apparatus provided at each end of the feeder being so arranged that two of the phases of the feeder have equal and opposite inductive effects on its secondary circuit whilst the inductive effect of the third phase is different from that of either of the other two phases.

7. In an electric protective system for a three-phase feeder or other three-phase set of conductors having a power transformer connected to one end thereof, the combination of two protective current transformers of the iron core ring type having their secondaries connected in series with one another disposed at each end of the feeder, a two-core pilot circuit into which the secondary windings of the said current transformers are so connected that there is normally a balance of E. M. F.'s in the pilot circuit, protective current transforming apparatus disposed on the side of the power transformer remote from the feeder and having a secondary circuit which cooperates with the pilot circuit in such a manner that when operated in consequence of a fault it will disturb the normal balance in the pilot circuit, and means whereby the out-of-balance effect in the pilot circuit resulting from a fault in the feeder or the power transformer is caused to cut out the feeder and the transformer, one phase of the protected feeder being passed through both transformer cores in such a direction that its inductive effects on the secondary windings are additive whilst the other two phases are each passed through one transformer core so that their inductive effects on the secondary circuit are opposed.

8. In an electric protective system for a three-phase feeder or other three-phase set of conductors having a power transformer connected to one end thereof, the combination of protective current transforming apparatus disposed at the ends of the feeder, a two-core pilot circuit into which the secondary windings of the said current transforming apparatus are so connected that there is normally a balance of E. M. F.'s in the pilot circuit, a circuit breaker on the side of the power transformer remote from the feeder, a circuit breaker at the end of the feeder remote from the power transformer, tripping relays controlling the circuit breakers and responsive to out-of-balance currents in the pilot circuit, a separate earth leakage protective device on the side of the power transformer remote from the feeder, tripping means whereby this earth leakage device is caused to operate the adjacent circuit breaker when a fault occurs on the power transformer winding, and an auxiliary switch which is associated with such tripping means and acts to short-circuit the two cores of the pilot circuit when such tripping means operate, and thereby to operate the tripping relays, the transforming apparatus provided at each end of the feeder being so arranged that two of the phases of the feeder have equal and opposite inductive effects on its secondary circuit whilst the inductive effect of the third phase is different from that of either of the other two phases.

9. In an electric protective system for a feeder or other conductor or set of conductors having a power transformer connected to one end thereof, the combination of protective current transforming apparatus disposed at the ends of the feeder, a two-core pilot circuit into which the secondary windings of the said current transforming apparatus are so connected that there is normally a balance of E. M. F.'s in the pilot circuit, a circuit breaker on the side of the power transformer remote from the feeder, a circuit breaker at the end of the feeder remote from the power transformer, tripping relays controlling the circuit breakers and responsive to out-of-balance currents in the pilot circuit, means for varying the sensitiveness of each tripping relay in accordance with the conditions in the feeder, a separate earth leakage protective device on the side of the power transformer remote from the feeder, tripping means whereby this earth leakage protective device is caused to operate the adjacent circuit breaker when a fault occurs on the power transformer winding, and an auxiliary switch which is associated with such tripping means and acts to short-circuit the two cores of the pilot circuit when such tripping means operates and thereby to operate the tripping relays.

10. In an electric protective system for a three-phase feeder or other three-phase set of conductors having a power transformer connected to one end thereof, the combination of protective current transforming apparatus disposed at the ends of the feeder, a two-core pilot circuit into which the secondary windings of the said current transforming apparatus are so connected that there is normally a balance of E. M. F.'s in the pilot circuit, protective current transforming apparatus disposed on the side of the power transformer remote from the feeder and having a secondary circuit which cooperates with the pilot circuit in such a manner that when operated in consequence of a fault it will disturb the normal balance in the pilot circuit, a circuit breaker on the side of the power transformer remote from the feeder, a circuit breaker at the end of the feeder remote from the power transformer, tripping relays controlling the circuit breakers and responsive to out-of-balance currents in the pilot circuit, a relatively insensitive relay associated with each tripping relay, and means whereby the insensitive relay acts to vary the sensitiveness of the tripping relay in accordance with the conditions in the feeder, the transforming apparatus provided at each end of the feeder being so arranged that two of the phases of the feeder have equal and opposite inductive effects on its secondary circuit whilst the inductive effect of the third phase is different from that of either of the other two phases.

11. In an electric protective system for a three-phase feeder or other three-phase set of conductors having a power transformer connected to each end thereof, the combination of protective current transforming apparatus disposed at the ends of the feeder, a two-core pilot circuit into which the secondary windings of the said current transforming apparatus are so connected that there is normally a balance of E. M. F.'s in the pilot circuit, protective current transforming apparatus disposed on the side of each power transformer remote from the feeder and having a secondary circuit which cooperates with the pilot circuit in such a manner that when operated in consequence of a fault it will disturb the normal balance in the pilot circuit, and means whereby the out-of-balance effect in the pilot circuit resulting from a fault in the feeder or either power transformer is caused to cut out the feeder and the transformers, the transforming apparatus provided at each end of the feeder being so arranged that two of the phases of the feeder have equal and opposite inductive effects on its secondary circuit whilst the inductive effect of the third phase is different from that of either of the other two phases.

12. In an electric protective system for a feeder or other conductor or set of conductors having a power transformer connected to one end thereof, the combination of protective current transforming apparatus disposed on the two sides of the power transformer and at the remote end of the feeder, a two-core pilot circuit into which all the secondary windings of the transforming apparatus are so connected in series that there is normally a balance of E. M. F.'s in the pilot circuit, and means whereby the out-of-balance effect in the pilot circuit resulting from a fault in the feeder or the power transformer is caused to cut out the feeder and the transformer.

13. In an electric protective system for a three-phase feeder or other three-phase set of conductors having a power transformer connected to one end thereof, the combination of protective current transforming apparatus disposed on the two sides of the power transformer and at the remote end of the feeder, a two-core pilot circuit into which all the secondary windings of the transforming apparatus are so connected in series that there is normally a balance of E. M. F.'s in the pilot circuit, and means whereby the out-of-balance effect in the pilot circuit resulting from a fault in the feeder or the power transformer is caused to cut out the feeder and the transformer, the transforming apparatus provided at each end of the feeder being so arranged that two of the phases of the feeder have equal and opposite inductive effects on its secondary circuit whilst the inductive effect of the third phase is different from that of either of the other two phases.

14. In an electric protective system for a feeder or other conductor or set of conductors having a power transformer connected to one end thereof, the combination of protective current transforming apparatus disposed on the two sides of the power transformer and at the remote end of the feeder, a two-core pilot circuit into which all the secondary windings of the transforming apparatus are so connected in series that there is normally a balance of E. M. F.'s in the pilot circuit, a circuit breaker on the side of the power transformer remote from the feeder, a circuit breaker at the end of the feeder remote from the power transformer, tripping relays controlling the circuit breakers and responsive to out-of-balance currents in the pilot circuit, and means for varying the sensitiveness of each tripping relay in accordance with the conditions in the feeder.

15. In an electric protective system for a feeder or other conductor or set of conductors having a power transformer connected to each end thereof, the combination of protective current transforming apparatus disposed at the two ends of the feeder and on the side of one of the power transformers remote from the feeder, a two-core pilot circuit into which the secondaries of the said transforming apparatus are so connected in series that there is normally a balance of E. M. F.'s in the pilot circuit, circuit breakers disposed on the sides of the power transformers remote from the feeder, tripping relays controlling the circuit breakers and responsive to out-of-balance currents in the pilot circuit, a separate earth leakage protective device on the side of the second power transformer remote from the feeder, tripping means whereby this earth leakage protective device is caused to operate the adjacent circuit breaker when a fault occurs on the winding of this power transformer, and an auxiliary switch which is associated with such tripping means and acts to short-circuit the two cores of the pilot circuit when such tripping means operates and thereby to operate the tripping relays.

In testimony whereof we have signed our names to this specification.

HENRY WILLIAM CLOTHIER.
REGINALD WILLIAM BILES.